United States Patent
Nakagawa et al.

[11] Patent Number: 6,086,261
[45] Date of Patent: Jul. 11, 2000

[54] TAPERED ROLLER BEARING

[75] Inventors: Kazufumi Nakagawa; Kazumi Adachi, both of Okayama; Kazunori Urakami, Bizen; Kouji Masuoka, Kuwana; Takashi Tsujimoto, Yokkaichi, all of Japan

[73] Assignee: NTN Corporation, Osaka-fu, Japan

[21] Appl. No.: 09/227,545

[22] Filed: Jan. 11, 1999

[30] Foreign Application Priority Data

| Jan. 14, 1998 | [JP] | Japan | 10-005823 |
| Jan. 14, 1998 | [JP] | Japan | 10-005824 |
| Jan. 14, 1998 | [JP] | Japan | 10-006048 |
| Jan. 26, 1998 | [JP] | Japan | 10-012731 |

[51] Int. Cl.[7] ............................ F16C 33/58; F16C 33/66; F16C 33/36
[52] U.S. Cl. ........................ 384/571; 384/462; 384/565; 384/568
[58] Field of Search .................... 384/565, 568, 384/569, 571, 462

[56] References Cited

U.S. PATENT DOCUMENTS

| 1,736,037 | 11/1929 | Else | 384/565 |
| 1,945,094 | 1/1934 | Strickland | 384/565 |
| 3,951,483 | 4/1976 | Nakamura | 384/565 |
| 4,877,340 | 10/1989 | Hoeprich | 384/571 |
| 5,007,747 | 4/1991 | Takeuchi et al. | 384/571 X |
| 5,921,685 | 7/1999 | Ishimaru et al. | 384/571 X |

*Primary Examiner*—Thomas R. Hannon
*Attorney, Agent, or Firm*—Arent Fox Kintner Plotkin & Kahn, PLLC

[57] ABSTRACT

The raceway groove width (W) of the inner ring 2 and the length (L) of the tapered roller 3 are finished within predetermined dimensional tolerances. The retaining rib face 2b of the inner ring 2 is machined such that it is a surface parallel to the small end faces 3b of the tapered rollers 3. The clearances δ which are defined when the tapered rollers 3 are disposed on the raceway surface 2a of the inner ring 2 and are contacted at the large end faces 3a thereof with the cone back face rib face 2c is secured to be within the dimensional range, $\delta \leq 0.4$ mm.

22 Claims, 11 Drawing Sheets

TAPERED ROLLER BEARING

BACKGROUND OF THE INVENTION

The present invention relates to a tapered roller bearing to be incorporated in a differential, transmission and the like of an automobile.

The tapered roller bearing is suitable for being loaded with radial load, axial load and a combination of such loads and has a large load bearing capacity. For this reason, tapered roller bearings are often used for supporting rotatable elements in power transmission devices (differentials, and transmissions) and the like of automobiles and construction machines.

For example, in a front-engine rear-drive automobile, engine, clutch and transmission are positioned in the front region of a car body and differential and drive shaft are positioned in the rear region of the car body; therefore, a propeller shaft is used for transmitting power therebetween. The rotary power of the engine is reduced in speed by the transmission (speed reducer) and then transmitted to the propeller shaft, through which it is fed into the differential (final speed reducer). The differential comprises a speed-reduction gear device and a differential device, wherein the speed-reduction gear device serves for rotary speed reduction and drive power increase, and particularly, in a vertical engine vehicle, the speed-reduction gear device changes the direction of transmission of driving power to right angle direction and then transmits it to a driving wheel shafts, while the differential device has the function which, when there occurs a difference in rotary speed between the right and left driving wheels, allows the two wheels to rotate on the differential basis and prevents slippage of the wheels.

FIG. 15 shows by way of example a tapered roller bearing to be incorporated in a differential as described above gear device. This tapered roller bearing comprises an outer ring 11 having a conical raceway surface 11a, an inner ring 12 having a conical raceway surface 12a and also having a retaining rib face 12b at the small diameter side of the raceway surface 12a and a cone back face rib face 12c at the large diameter side, a plurality of tapered rollers 13 disposed for rolling between the raceway surfaces 11a and 12a of the outer and inner rings 11 and 12, and a cage 14 for retaining the tapered rollers 3 at predetermined circumferential intervals.

During operation of the bearing, the tapered rollers 13 are pressed against the cone back face rib face 12c of the inner ring 12 by a resultant force received from the raceway surfaces 11a and 12a, while rolling on the raceway surfaces with their large end faces 13a contacted and guided by the cone back face rib face 12c. On the other hand, during operation of the bearing, the small end faces 13b of the tapered rollers 13 do not contact the retaining rib face 12b of the inner ring 12, so that there are slight clearances therebetween. Therefore, in the bearing producing process, as concerns the rib faces of the inner ring 12 and the end faces of the tapered roller 13; for purpose of reducing wear, grinding-finish is applied only to the cone back face rib face 12c and large end faces 13a where slide contact occurs, but not applied to the retaining rib face 12b and small end faces 13b where slide contact does not occur.

When such tapered roller bearing described above is assembled such that the assembly comprising the cage 14, plurality of tapered rollers 13 and inner ring 12 is inserted from above into the raceway surface 11a of the outer ring 11 with the retaining rib face 12b of the inner ring 12 directed downward, then, in the assembled state (initial state), the tapered rollers 13 do not sit in their normal positions on the raceway surface (because their degree of freedom with respect to the cage 14 and inner ring 12 does not allow the tapered rollers 13, when inserted, to have their attitudes fixed), so that, as shown in FIG. 16(a), the small end faces 13b come in contact with the retaining rib face 12b of the inner ring 12, with clearances δ defined between the large end faces 13a and the cone back face rib face 12c. When the bearing is rotated by a predetermined number of revolutions from this initial state with a thrust load Fa imposed on the bearing {FIG. 16(c)}, the tapered rollers 13 are axially moved by an amount corresponding to the clearances δ toward the cone back face rib face 12c until the large end faces 13a contact the cone back face rib face 12c to allow the tapered rollers 13 to settle in their normal positions {FIG. 16(b)}.

In the initial state shown in FIG. 16(a), the bearing is mounted on the mount portion of a mating device, fixed therein, pre-loaded, and normally operated, whereupon the tapered rollers 13 are axially moved toward the cone back face rib face 12c, resulting in the loss of the pre-load, making it impossible to obtain the required bearing function. Accordingly, as conventionally practiced, prior to normal operation, the bearing in the initial state shown in FIG. 16(a) is temporarily fitted in the mount portion of a mating device and is run in until the tapered rollers 13 settle in their normal positions as shown in FIG. 16(b), whereupon the bearing is fixed in the mount portion and is given a predetermined pre-load. In this case, if the clearances δ in the initial state increase in dimension or the range of variation thereof enlarge, or if the axial movements of the tapered rollers 13 toward the cone back face rib face 12c do not take place smoothly, the running-in time required for allowing the tapered rollers 13 to settle in their normal positions increases and so does the time required until the establishment of pre-load is completed.

Therefore, from the viewpoint of reducing the running-in time, it is desirable that the dimensions of the clearances δ and the range of variation thereof in the initial state shown in FIG. 16(a) be minimized; however, the conventional tapered roller bearing presents the following problem.

As shown enlarged in FIG. 17, the retaining rib face 12b of the inner ring 12 of the conventional tapered roller bearing is outwardly inclined with respect to the small end faces 13b of the tapered rollers 3 disposed on the raceway surface 12a. Therefore, because of the variation in the dimension and shape of the chamfers of the small end faces 13b (generally, the small end face of a tapered roller is as-forged, and the variation in the dimension and shape of the chamfers thereof are large, which variation in the dimension and shape of the chamfers is found not only among tapered rollers but also circumferentially of a tapered roller itself), the points of contact between the small end faces 13b and the retaining rib face 12b in the assembled state (initial state) vary. For example, if the chamfers of the small end faces 13b are as shown in solid line in the same figure, the points of contact in the initial state are P3 and P4, whereas if the chamfers of the small end faces 13b are as shown in dotted line in the same figure, the points of contact in the initial state move toward the large diameter side to P3' and P4'. When the tapered rollers 13 are axially moved toward the side associated with the large end faces and contacted at large end face thereof with the cone back face rib face, let δ3 be the values of the clearances between points P3 and P4, and δ4 be the values of the clearances between points P3' and P4', δ3<δ4. This means the values of the clearances δ vary with the variation of the contact points caused by the variation in the chamfer dimension. For this reason, it is difficult to secure the clearances δ with accuracy.

Further, since the variation in the dimension and shape of the chamfers of the small end faces 13b causes the values of the clearances δ to vary, the variation of the clearances δ will inevitably increase even if the raceway groove width dimension (W') of the inner ring 12 and the length dimensions (L') of the tapered rollers are controlled with accuracy.

When the variation in the clearances δ caused by the variation in the dimension and shape of the chambers of the small end faces of the tapered rollers is considered with respect to a certain tapered roller bearing, the variation occurs among the plurality of assembled tapered rollers, producing a difference in the time it takes for the tapered rollers to settle in their normal positions. Therefore, the number of times for the running-in of the bearing (number of revolutions of the bearing: number of times for settlement) required till completion of settlement as a bearing is increased. Further, since the variation in the clearances δ occurs among bearings, there occurs among bearings a variation in the number of times for settlement. An attempt to tackle this problem by reducing the control range (dimensional tolerance) for the raceway groove width dimension (W') and length dimensions (L') and by reducing the reference value for the dimensions of the clearances δ would lead to increases in machining cost and control cost.

Further, normally, the control of the raceway groove width dimension (W') of the inner ring 12 is made with the end surface used as a dimensional reference, but errors are likely to build up and it is difficult to reduce the variation in the raceway groove width dimension (W'). To solve this problem, it may be contemplated to control the raceway groove width dimension (W') with the retaining rib face 12b used as a dimensional reference. However, the conventional retaining rib face 12b has an inclined shape and a difference in the raceway groove width dimension (W') occurs according to how a reference position is selected, so that it is difficult to finish the groove with dimension (W') with accuracy.

Further, conventionally, the running-in operation has been practiced with the tapered rollers retaining the rust-preventive oil initially applied thereto when shipping. However, this rust-preventive oil applied when shipping is intended mainly for rust prevention, being poor in lubricating performance. Therefore, formation of oil films between the rolling surfaces of the tapered rollers and the raceway surfaces of the inner and outer rings is insufficient, resulting in the tapered rollers sometimes failing to smoothly axially move toward the side associated with the large end face, tending to lengthen the time for running-in operation.

Further, the conventional tapered roller bearing is designed such that the position of the center of the region of contact between the rolling surface 13c of the tapered roller 13 and the raceway surfaces 12a and 11a of the inner and outer rings 12 and 11 is located in the axial center of the tapered roller 13 (the position of ½ of the length L'), so that there are cases where the axial movements of the tapered rollers 13 during running-in operation do not occur smoothly, tending to lengthen the running-in time.

SUMMARY OF THE INVENTION

An object of the present invention is to shorten the running-in time in this type of tapered roller bearing and increase the efficiency of pre-load operation while giving due consideration to cost-effectiveness.

To achieve the object, the invention provides a tapered roller bearing comprising an outer ring having a conical raceway surface, an inner ring having a conical raceway surface, a retaining rib face at the small diameter side and a cone back face rib face at the large diameter side of the raceway surface, a plurality of tapered rollers disposed for rolling between the raceway surfaces of the outer and inner rings, and a cage for retaining the tapered rollers at predetermined circumferential intervals, wherein operation of the bearing, the large end faces of the tapered rollers are contacted and guided by the cone back face rib face of the inner ring, and wherein the retaining rib face of the inner ring is a surface which is parallel to the small end faces of the tapered rollers disposed on the raceway surface of the inner ring and which defines one end of the raceway groove width of the inner ring defining the range of axial movements of the tapered rollers.

As shown enlarged in FIG. 6, the retaining rib face 2b of the inner ring 2 is made parallel to the small end faces 3b of the tapered rollers 3 disposed on the raceway surface 2a, whereby the influence of the variation in the dimension and shape of the chamfers of the small end faces 3b on the clearances δ can be eliminated. For example, if the chamfers of the small end faces 3b are as shown in solid line in the same figure, the points of contact in the assembled state (initial state) are P5 and P6, whereas if the chamfers of the small end faces 3b are as shown in dotted line in the same figure, the points of contact in the initial state are moved toward the large diameter side to P5' and P6'.

Let δ5 be the values of the clearance between points P5 and P6 when the tapered rollers 3 are axially moved toward the side associated with the large end faces until the large end faces contacts the cone back face rib face, and δ6 be the values of the clearances between points P5' and P6'. Then, since the retaining rib face 2b and small end faces 3b are parallel, δ5=δ6, so that even if the points of contact vary, the values of the clearance δ do not vary. Thus, the variation in the clearances δ due to the variation in the dimension and shape of the chamfers of the small end faces 3b disappears.

In the case where a certain tapered roller bearing is considered, since no variation in the clearances δ due to the variation in the dimension and shape of chamfers of the small end faces is found among a plurality of tapered rollers assembled therein, the difference in the time required until the tapered rollers settle in the their normal positions is reduced. Therefore, the number of times of running-in operation (number of revolutions of the bearing: number of times for settlement) required till completion of settlement is reduced. Further, variation in the number of times for settlement for each bearing is suppressed.

Further, finishing the cone back face rib face with the retaining rib face of the shape used as a dimensional reference ensures that the raceway groove width (W) extending from the retaining rib face to the cone back face rib face is controlled with accuracy.

The retaining rib face of the shape defines one end of the raceway groove width of the inner ring defining the range of axial movement of the tapered rollers and serves as a reference for the control of the clearances δ and the control of the raceway groove width dimension (W); thus, for securement of accuracy, it should desirably be a grinding-finished surface, but if the required accuracy can be secured, it may be a lathing-finished surface for cost reduction.

The clearances δ between the retaining rib face of the inner ring and the small end faces of the tapered rollers produced when the tapered rollers are disposed on the raceway surface of the inner ring with the large end faces of the tapered rollers brought into contact with the cone back face rib face of the inner ring can be controlled to be in the dimensional range, $\delta \leq 0.4$ mm. The expression $\delta \leq 0.4$ mm means that the maximum value of the clearances $\delta$ does not exceed 0.4 mm. The reason for $\delta \leq 0.4$ mm is as follows.

Tapered roller bearings were assembled such that matching between the inner ring and the tapered rollers resulted in the clearances $\delta$ in the initial state shown in FIG. 16(*a*) being $\delta > 0.5$ mm (for a tapered roller bearing in which the retaining rib face of the inner ring is outwardly inclined with respect to the small end faces of the tapered rollers) and $\delta \leq 0.45$ mm (for a tapered roller bearing in which the retaining rib face of the inner ring is parallel to the small end faces of the tapered rollers). Then, the number of times of running-in operation (number of revolutions of the bearing: number of times for settlement) of these tapered roller bearings required for a change from the initial state shown in FIG. 16(*a*) to the state of settlement shown in FIG. 16(*b*) was found. The results were as follows.

|  | $\delta > 0.5$ | $0 < \delta \leq 0.45$ |
|---|---|---|
| Number of samples | 10 | 66 |
| Number of times for settlement (average) | 6.0 | 2.96 |
|  | (minimum, 2; maximum, 8) | (minimum, 2; maximum, 4) |
| Standard deviation | $\sigma_{n-1} = 1.33$ | $\sigma_{n-1} = 0.56$ |

As shown above, for $\delta \leq 0.45$ mm, the number of times for settlement was low, offering good results. Particularly for $\delta \leq 0.4$ mm, the number of times for settlement was low and there was observed a tendency for the variation to decrease. Accordingly, the present invention has selected $\delta \leq 0.4$ mm as a more desirable range.

According to the invention, factors for variation in the clearances $\delta$ due to variation in the dimension and shape of the chambers of the small end faces of the tapered rollers are eliminated. Thus, even if the reference value for the clearances $\delta$ is set to a large value within the allowable range, the resulting variation in the clearances $\delta$ is so small that the state of settlement of the tapered roller bearing is obtained in a short time during running-in operation; thus, it is possible to shorten the running-in operation time for this type of tapered roller bearings and increase the efficiency of pre-loading operation. Further, satisfactory results can be obtained even when the control width (dimensional tolerance) for the raceway groove width of the inner ring and for the length of tapered roller and the reference value for the clearance $\delta$ are set to large values within the allowable range; thus, the invention is advantageous in respect of machining cost and control cost reduction.

Further, to achieve the above-mentioned object, the invention provides a tapered roller bearing comprising an outer ring having a conical raceway surface, an inner ring having a conical raceway surface, a retaining rib face at the small diameter side of the raceway surface, and a cone back face rib face at the large diameter side, a plurality of tapered rollers disposed for rolling between the raceway surfaces of the outer and inner rings, and a cage for retaining the tapered rollers at predetermined circumferential intervals, wherein a rust-preventive lubricating oil whose kinematic viscosity at 20° C. is 120 cst or more is applied to at least the surfaces of the components being subjected to friction. This rust-preventive lubricating oil unites rust preventing ability and good lubricating ability and is used in place of the rust-preventive oil heretofore applied to bearings for the main purpose of rust prevention when shipping. The reason for employing such arrangement is as follows.

First, tapered roller bearings were assembled such that matching between the inner ring and the tapered rollers resulted in the clearances $\delta$ in the assembled state (initial state) being $\delta = 0.2$ mm, 0.25 mm, 0.3 mm, 0.4 mm and the conventional rust-preventive oil (whose kinematic viscosity at 20° is 66 cst) and a gear oil (whose kinematic viscosity at 20° is 439 cst) were applied thereto. Then, the number of times of running-in operation (number of revolutions of the bearing: number of times for settlement) of these tapered roller bearings required until the tapered rollers were axially moved from the initial state by an amount corresponding to the clearances $\delta$ to come into contact with the cone back face rib face and settled were found. The results shown in Table 1 were obtained.

TABLE 1

| | | Number of times for settlement (average) | | | |
|---|---|---|---|---|---|
| | Kinematic | Clearance $\delta$ (mm) | | | |
| Oil applied | viscosity (cst) | 0.2 | 0.25 | 0.3 | 0.4 |
| Rust-preventive oil | 66 | 6.0 | 6.0 | 5.0 | 7.0 |
| Gear oil | 439 | 2.0 | 2.4 | 3.0 | 3.2 |

*Values of kinematic viscosity are at 20° C.

As shown in Table 1, for bearings having the conventional rust-preventive oil (whose kinematic viscosity is 66 cst) applied thereto, the number of times for settlement is large (6 on the average) even when the clearances $\delta$ are as small as 0.2 mm, whereas for bearings having the gear oil (whose kinematic viscosity is 439 cst) applied thereto, the number of times for settlement is small (3.2 on the average) even when the clearances $\delta$ are 0.4 mm, the results being satisfactory.

Then, the relationship between the kinematic viscosity of oil and the number of times for settlement of bearings was found by controlling the dimension of the clearances $\delta$ so that $\delta \leq 0.4$ mm ($\delta \leq 0.4$ mm means that the maximum value of the clearances $\delta$ does not exceed 0.4 mm) and applying five types of oil (whose kinematic viscosity at 20° C. is 19 cst, 66 cst, 128 cst, 330 cst, and 439 cst, respectively) to bearings. The results shown in FIG. 7 are obtained. The test conditions are: thrust load Fa=5 kgf, number of revolutions of inner ring=15 rpm, test temperature is 20° C.

As shown in FIG. 7, the number of times for settlement of bearings decreases in proportion to the kinematic viscosity of oil and the results obtained are that it is 6 on the average (minimum, 3) for an oil whose kinematic viscosity is 128 cst, 4 on the average (minimum, 2) for 330 cst, and 3 on the average (minimum, 2) for 439 cst, the results being satisfactory.

It is seen from the above test results that application of an oil whose kinematic viscosity at 20° C. is 120 cst or more shortens the time of running-in operation of bearings and that application of an oil whose kinematic viscosity at 20° C. is 300 cst or more is particularly effective.

In addition to the above arrangement, an arrangement is made that an oil film parameter $\Lambda$ expressed by the following formula is not less than 1, thereby enhancing formation of oil films, offering more desirable results.

$$\Lambda = h_0/(\sigma_1^2 + \sigma_2^2)^{1/2}$$

$h_0$: thickness of oil films formed between rolling surface of tapered roller and raceway surfaces of inner and outer rings $\sigma_1$: average roughness of rolling surface of tapered roller
$\sigma_2$ average roughness of raceway surfaces of inner and outer rings.

The relationship between the kinematic viscosity of oil and the thickness of oil film (formed between the rolling surface of the tapered roller and the raceway surfaces of the inner and outer rings) was found by setting $\sigma_1$=0.08 µm Ra and $\sigma_2$=0.13 µm Ra and applying five types of oil (whose kinematic viscosity at 20° C. is 19 cst, 66 cst, 128 cst, 330 cst, and 436 cst, (respectively) to bearings. The results shown in FIG. 8 are obtained. The test conditions are: thrust load Fa=5 kgf, number of revolutions of inner ring=15 rpm, test temperature=20° C.

As shown in FIG. 8, the thickness of oil film increases in proportion to the kinematic viscosity of oil (the oil film thickness also increases in proportion to the rotary speed), and it has been observed that when the kinematic viscosity of oil is 120 cst or more, $\Lambda \geq 1$ even for slow rotation during running-in operation.

According to the invention, a rust-preventive lubricating oil whose kinematic viscosity at 20° C. is 120 cst or more is applied to at least the surfaces of components being subjected to friction, so that a satisfactory oil film is formed between the rolling surfaces of the tapered rollers and the raceway surfaces of the inner and outer rings; thus, the axial movements of the tapered rollers toward the side associated with the large end faces are enhanced. Therefore, the running-in operation time for this type of tapered roller bearings can be shortened and the reliability in the pre-loading operation subsequent to the running-in operation can be improved. Further, the reference value for the clearances $\delta$ can be set to a large value in the allowable range, a fact which is advantageous from the standpoint of reducing the machining cost and control cost. Further, the oil film parameter $\Lambda$ increasing to 1 or more enhances formation of oil films, providing remarkable effectiveness.

Further, to achieve the object, the invention provides a tapered roller bearing comprising an outer ring having a conical raceway surface formed with a crowning, an inner ring having a conical raceway surface formed with a crowning, a retaining rib face at the small diameter side of the raceway surface, and a cone back face rib face at the large diameter side, a plurality of tapered rollers having a conical rolling surface formed with a crowning and disposed for rolling between the raceway surfaces of the outer and inner rings, and a cage for retaining the tapered rollers at predetermined circumferential intervals, a center position of contact between a rolling surface of the tapered roller and the raceway surfaces of the inner and outer rings is shifted from the axial center of the tapered roller toward the large diameter side.

The term "crowning" (convex crowning) means providing the generatrix of the raceway surface or rolling surface with slight curvature, including one in which it is provided with a plurality of curvatures (complex crowning), besides a single curvature.

Contact between a rolling surface and a raceway surface is theoretically point contact, but the amount of crowning is so small that practically such contact is axial line contact in the vicinity of the top of the crowning.

The center position of contact between the rolling surface and the raceway surfaces is shifted from the axial center of the tapered roller (i.e., from the position of L/2 where L is the length of the tapered roller). Under this condition, the number of times of running-in operation (number of revolutions of bearing: number of times for settlement) lasting from the initial state shown in FIG. 16(a) to settlement shown in FIG. 16(b) was found. And the results shown in FIG. 11 were obtained.

As shown in FIG. 11, shifting the center position of contact from the position of L/2 toward the large diameter side reduces the number of times for settlement of the bearing. Particularly when the amount of shift $\alpha$ toward the large diameter side was 5% or 10% of the length L of the tapered roller, satisfactory results were obtained. If the amount of shift $\alpha$ exceeds 10%, there would be an adverse influence on the smooth rolling of the tapered roller. Thus, it is desirable that the amount of shift $\alpha$ be not more than 10%.

According to the invention, since the center position of contact between the rolling surface of the tapered rollers and the raceway surfaces of the inner and outer rings is shifted from the axial center of the tapered roller toward the large diameter side, the axial movements of the tapered rollers toward the side associated with the large end faces is enhanced. And the running-in operation time for this type of tapered roller bearings can be shortened and the reliability in the pre-loading operation subsequent to the running-in operation can be improved. Further, the reference value for the clearances $\delta$ can be set to a large value in the allowable range, a fact which is advantageous from the standpoint of reducing the machining cost and control cost.

A rotatable shaft support structure which rotatably supports a rotatable shaft by the tapered roller bearing as mentioned above with respect to the casing provides for high efficiency of pre-loading operation and high reliability of pre-loading, so that such structure is suitable for use as a support structure for an automobile gear device, particularly the drive pinion shaft of the differential.

To make automobiles fuel-efficient, it is imperative to reduce loss in transmission of power in the power transmission system. As a means therefor, it is contemplated to reduce the friction torque on the bearing portions in the power transmission system. In that case, it is effective to reduce the friction torque on the bearing supporting the pinion shaft of the differential gear.

Accordingly, in the present invention, the angle (contact angle $\alpha$) which the raceway surface of the outer ring forms with the bearing center axis is set to 21–25 degrees; the ratio (thickness ratio PR=DA/W×100) of the average diameter (DA) of the tapered rollers to the distance (W) between the inner surface of the inner ring and the outer surface of the outer ring, taken in a section extending orthogonal to the axis of the tapered roller and through the position where the diameter of the tapered roller takes the value of the average diameter DA, is set to 40%–51%; the roller coefficient ($\gamma$) expressed by $\gamma=(Z \cdot DA)/(\pi \cdot PCD)$ (Z: the number of tapered rollers, DA: average diameter of tapered rollers, PCD: pitch circle diameter of tapered rollers) is set to 0.86–0.94; and the ratio (=L/DA) of the length L of tapered roller to the average diameter (DA) is set to 1.20–2.25.

Generally, the rotation torque (M) on a tapered roller bearing consists chiefly of a rolling friction torque (MR) acting between the rolling surfaces of the tapered rollers and the raceway surfaces of the inner and outer rings and a sliding friction torque (MS) acting between the large end faces of the tapered rollers and the cone back face rib face of the inner ring. As shown in FIG. 14, the sliding friction torque (MS) decreases with increasing rpm, while the rolling friction torque (MR) increases with increasing rpm; therefore, the rotation torque (M) shows a tendency to decrease with increasing rpm until a certain rpm NO, beyond which it increases with increasing rpm. Conventionally, efforts have been made to reduce the roughness of the large end face of the tapered roller and the cone back face rib face of the inner ring so as to reduce the rotation torque (M). However, it is the sliding friction torque (MS) alone that can be reduced by such procedure, it being impossible to reduce the rolling friction torque (MR) which constitutes the greater part of the torque which appears in the high and medium speed ranges of rotation.

Setting the contact angle α, thickness ratio PR, roller coefficient γ, and ratio (L/DA) to the aforesaid values reduces the rolling friction torque MR and effectively reduces the rotation torque (M) particularly in the high and medium speed ranges of rotation.

Further, to reduce the sliding friction torque (MS), the average roughness (R) $\{R=(Rr^2+Rb^2)^{1/2}\}$ which is the average of the roughness (Rr) of the large end face of the tapered roller and the roughness (Rb) of the cone back face rib face of the inner ring which contacts and guides the large end face may be set to 0.14 μm Ra or less.

According to the present invention, the turning torque in the high and medium speed ranges of rotation of the tapered roller bearing is reduced to reduce loss in transmission of power from the differential gear, thereby making it possible to make automobiles fuel-efficient. Further, since the contact angle α is set in the range of 21–25 degrees, high bearing rigidity and long service life can be expected, as compared with the comparative article.

DESCRIPTION OF THE PREFERRED EMBODIMENTS

Embodiments of the present invention will now be described.

Figure 1:
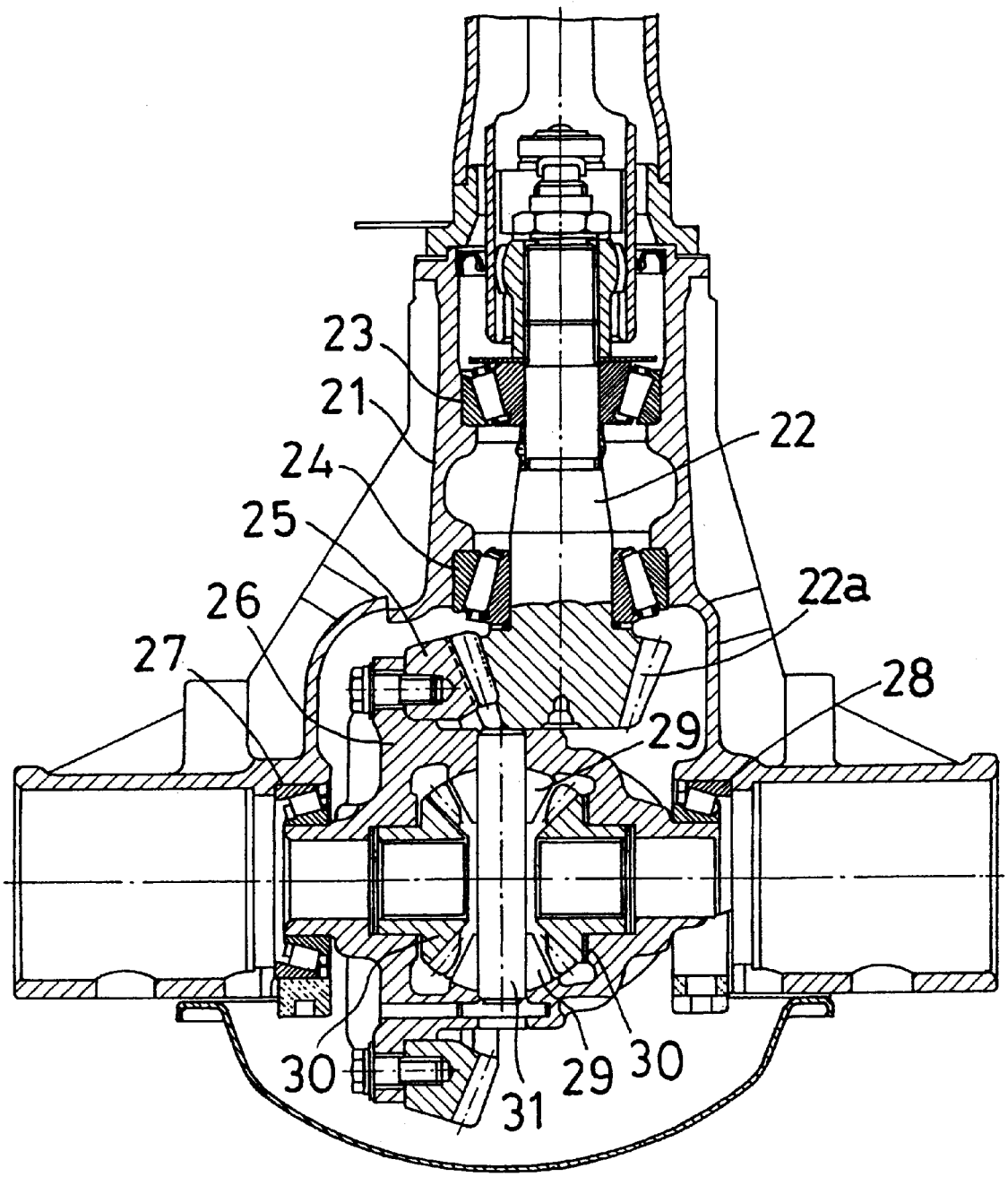
FIG. 1 is a sectional view showing an example of the arrangement of the differential of an automobile.

FIG. 1 shows an example of the arrangement of a differential of an automobile. In this figure, the upward and downward directions are the forward and rearward directions of the car body, respectively. A drive pinion shaft 22 is inserted in the front inner peripheral surface of a differential case 21 and is rotatably supported by a pair of tapered roller bearings 23 and 24. The front end of the drive pinion shaft 22 a propeller shaft connected to, the rear end thereof a drive pinion gear (small speed-reduction gear) 22*a* connected to or integrally formed on, the drive pinion gear meshing with a ring gear (large speed-reduction gear) 25.

The ring gear 25 is connected to a differential gear case 26 which is rotatably supported by a pair of tapered roller bearings 27 and 28 relative to the differential case 21. Installed in the differential gear case 26 are a pair of pinion gears 29 and a pair of side gears 30 meshing therewith. The pinion gears 29 are fixed on a pinion shaft 31, and the side gears 30 are mounted on the differential gear case 26 through thrust washers. The unillustrated right and left drive shafts are connected (as by serrations) to the bores of the side gears 30 respectively corresponding thereto.

The driving torque of the propeller shaft is transmitted along the path: drive pinion gear 22*a*→ring gear 25→differential gear case 26→pinion gears 29→side gears 30→drive shafts. On the other hand, the drive resistance of the tires is transmitted, drive shafts→side gears 30→pinion gears 29.

Figure 2:
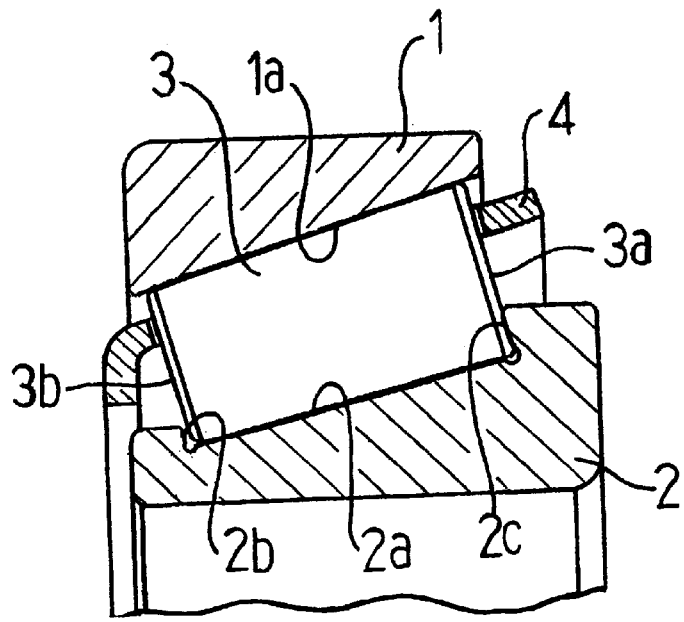
FIG. 2 is a sectional view of a tapered roller bearing according to an embodiment.

FIG. 2 shows tapered roller bearings (bearings 23, 24, 27, 28, particularly, bearings 23, 24 for rotatably supporting the drive pinion shaft 22 relative to the differential case 21) incorporated in the differential of an automobile, as described above. The tapered roller bearing in this embodiment comprises an outer ring 1 having a conical raceway surface 1*a*, an inner ring 2 having a conical raceway surface 2*a*, a retaining rib face 2*b* at the small diameter side of the raceway surface 2*a*, and a cone back face rib face 2*c* at the large diameter side, a plurality of tapered rollers 3 disposed for rolling between the raceway surfaces 1*a* and 2*a* of the outer and inner rings 1 and 2, and a cage 4 for retaining the tapered rollers 3 at predetermined circumferential intervals. During operation of the bearing, the tapered rollers 3 are pressed against the cone back face rib face 2*c* of the inner ring 2 by a resultant force received from the raceway surfaces 1*a* and 2*a*, while rolling on the raceway surfaces with their large end faces 3*a* contacted and guided by the cone back face rib face 2*c*. During operation of the bearing, the small end faces 3*b* of the tapered rollers 3 do not contact the retaining rib face 2*b* of the inner ring 2, but there are slight clearances therebetween.

Figure 3:
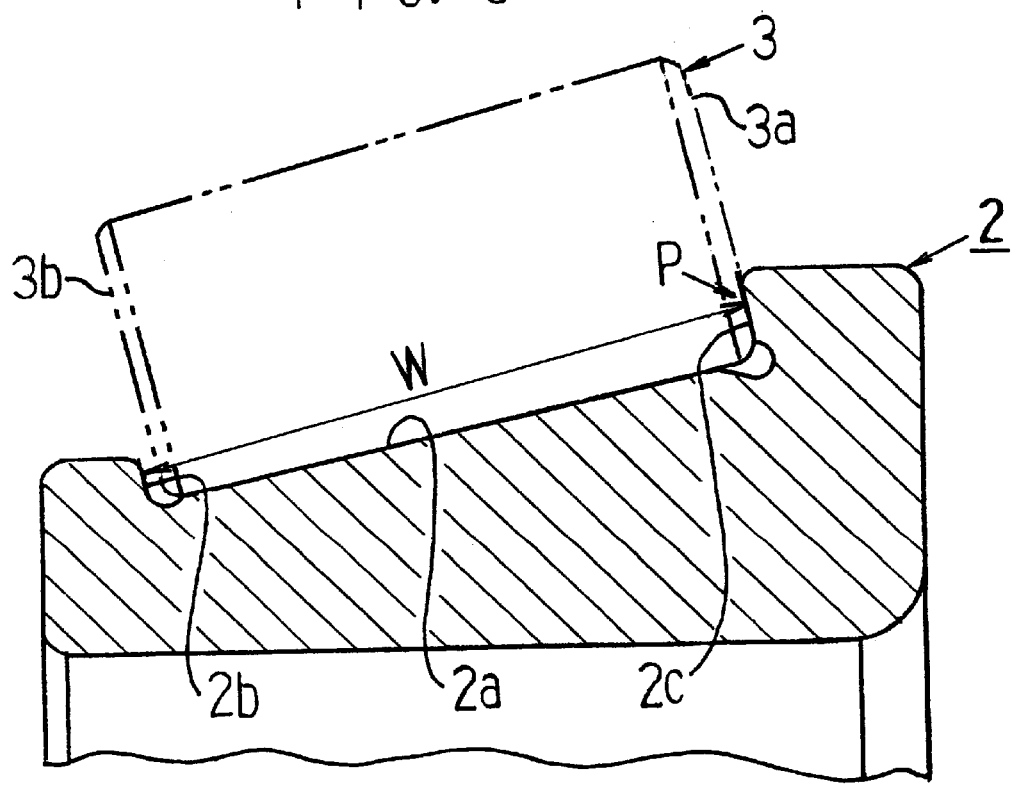
FIG. 3 is a sectional view of the inner ring of the tapered roller bearing shown in FIG. 2.

FIG. 3 shows the inner ring 2. The inner ring 2 is produced from a steel blank through the steps: forging→lathing→heat treatment→grinding. Normally, the grinding is applied to the end surfaces, inner surface, raceway surface 2*a*, and cone back face rib face 2*c*. In this embodiment, however, the retaining rib face 2*b* is lathed such that it is substantially parallel to the small end faces 3*b* of the tapered rollers 3

(disposed on the raceway surface 2a) as shown in chain lines in the same figure, and further ground for finish to provide a surface which is parallel to the small end faces 3b. In addition, if the required precision can be obtained, the retaining rib face 2b may be finished by lathing to provide a surface which is parallel to the small end faces 3b.

The cone back face rib face 2c may be finished by grinding while measuring the raceway groove width dimension (W) from the retaining rib face 2b with an in-process gauge by using the retaining rib face 2b as a dimensional reference. This ensures that the raceway groove width dimension (W) is finished with accuracy within a predetermined dimensional tolerance with respect to the target dimension. Generally, grinding based on in-process gauge is a process in which a gauge is applied to a workpiece during grinding to detect the grinding completion dimension, whereupon the grinding is finished.

The raceway groove width dimension (W) of the inner ring 2 is the dimension between the retaining rib face 2b and the position P where the large end face 3a of the tapered roller 3 contacts the cone back face rib face 2c (said dimension being parallel to the axis of the tapered roller 3), and the retaining rib face 2b provides a surface defining one end of the raceway groove width.

Figure 4:
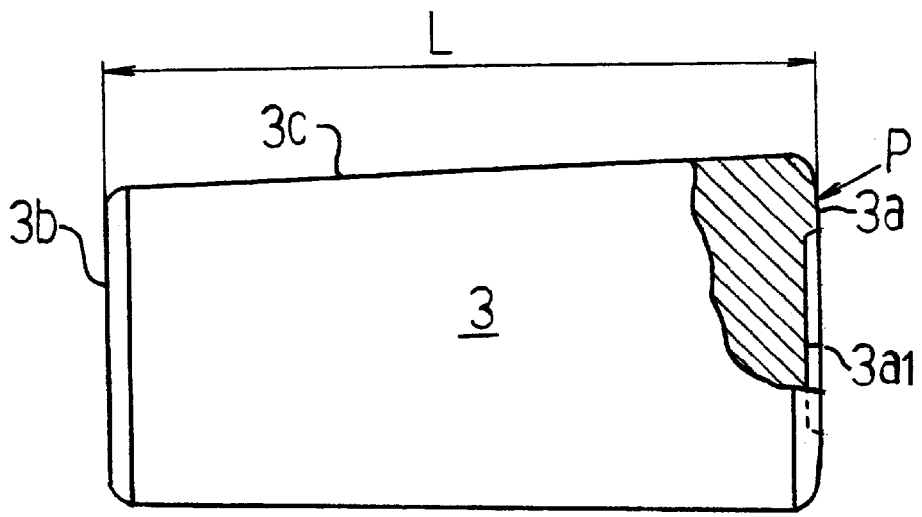
FIG. 4 is a front view of a tapered roller of the tapered roller bearing shown in FIG. 2.
Figure 5:
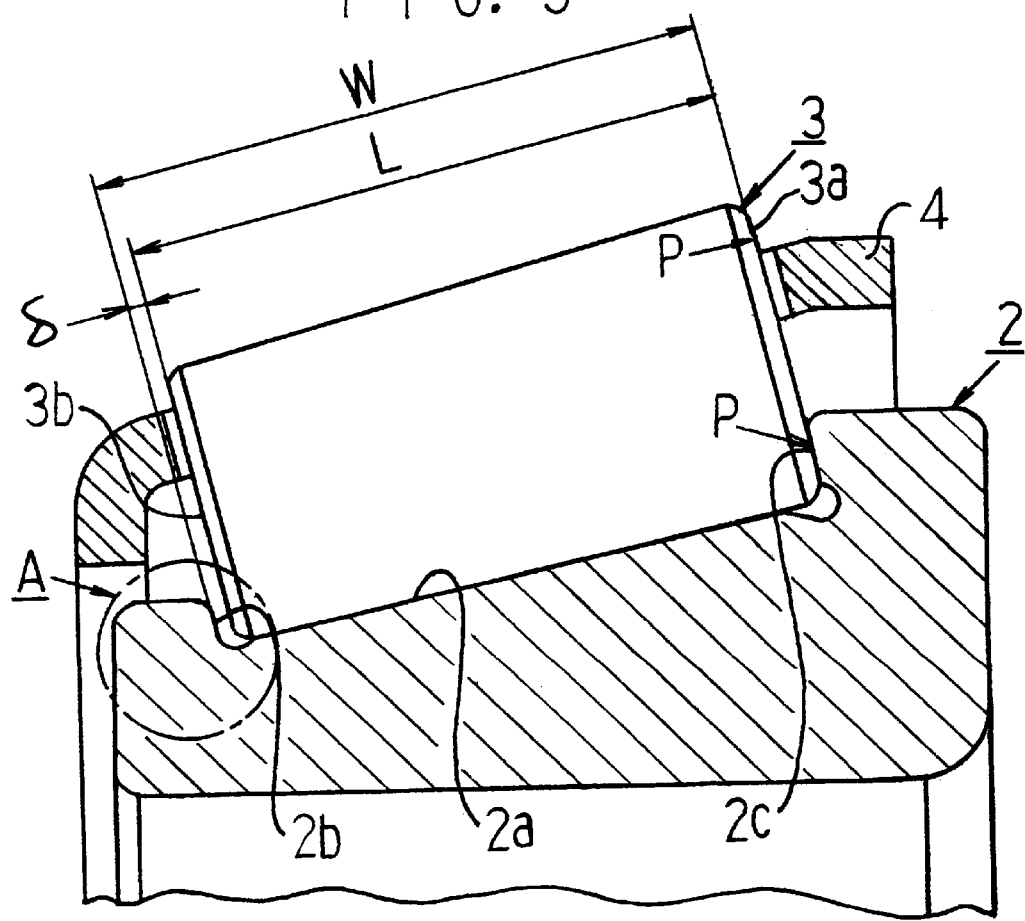
FIG. 5 is a sectional view showing how a clearance δ is measured.
Figure 6:
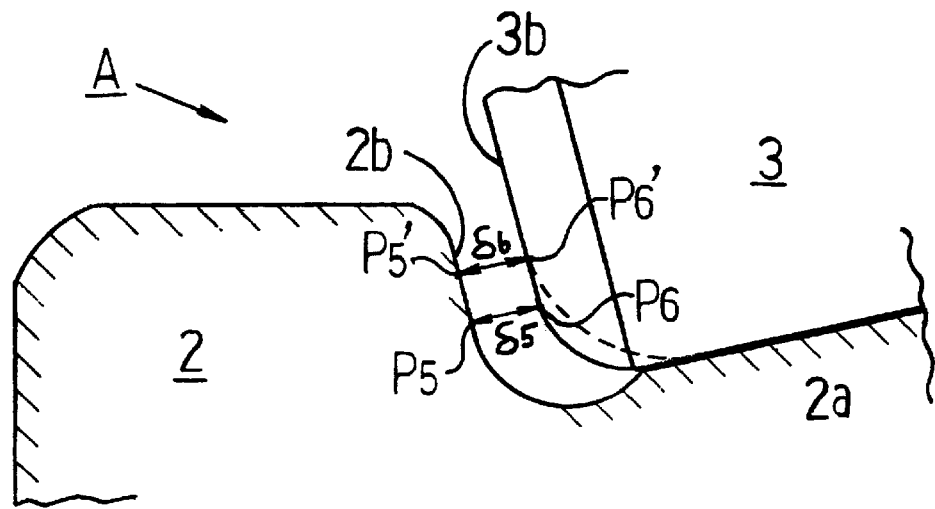
FIG. 6 is an enlarged sectional view of an area A in FIG. 5.

As shown in FIG. 4, the tapered roller 3 has a large end face 3a with a curvature (end surface rounding: exaggerated in the figure) at one end and a flat small end face 3b with no curvature at the other end thereof. A relieved portion 3a1 is formed in the central region of the large end face 3a. The large end face 3a (excluding the relieved portion 3a1) and the rolling surface 3c are finished by grinding, whereas the small end face 3b is normally left as-forged. The length dimension (L) of the tapered roller 3 is finished within a predetermined tolerance with respect to the target dimension. In addition, the length dimension (L) is the dimension between the small end face 3b and the retaining rib face 2b and the position P where the large end face 3a contacts the cone back face rib face 2c (the dimension being parallel to the axis of the tapered roller 3).

When the tapered roller bearing of this embodiment is assembled in the same manner as in the conventional bearing such that an assembly comprising the cage 4, the plurality of tapered rollers 3 and inner ring 2 is inserted from above into the raceway surface 1a of the outer ring 1 with the retaining rib face 2b of the inner ring 2 directed downward, the tapered rollers 3 will not be seated in their normal positions on the raceway surface during assembling operation and instead their small end faces 3b contact the retaining rib face 2b of the inner ring 2, with clearances $\delta$ defined between the large end faces 3a and the cone back face rib face 2c. In this initial state and with a thrust load imposed, the bearing is rotated by a required number of revolutions, whereupon the tapered rollers 3 are axially moved toward the cone back face rib face 2c by an amount corresponding to the clearances $\delta$. Thus, as shown in FIG. 2, the large end faces 3a contact the cone back face rib face 2c, with the tapered rollers 3 settling in their normal position.

To shorten the number of times of running-in operation (number of revolutions of the bearing: number of times for settlement) required until the state of settlement shown in FIG. 2 is established, as described above, it is desirable to minimize the range of variation of the clearances $\delta$ (the distance axially traveled by the tapered roller 3). In this embodiment, the raceway groove width dimension (W) of the inner ring 2; the length dimensions (L) of the tapered rollers 3 are finished within predetermined dimensional tolerances; the retaining rib face 2b of the inner ring 2 is machined so that it is parallel to the small end faces 3b of the tapered rollers 3; and the clearances $\delta$ between the retaining rib face 2b and the small end faces 3b defined when the tapered rollers 3 are disposed on the raceway surface 2a of the inner ring 2 and the large end faces 3a thereof are brought into contact with the cone back face rib face 2c are measured, whereby the clearances $\delta$ are secured so that they are within the dimensional range, $\delta \leq 0.4$ mm. Therefore, it is possible to reliably hurdle the result of measurement of the number of times of running-in operation (number of times for settlement), which is 4 or less (2.96 on the average); thus, the running-in operation can be completed in a relatively short time. Further, since the control width (dimensional tolerance) of the raceway groove width dimension (W) and length dimension (L), and the reference value for the clearances $\delta$ can be set to large values within an allowable range, this arrangement is advantageous from the standpoint of the reduction of machining cost and control cost.

After the clearance $\delta$ has been secured to a required value in the manner described above, the assembly (comprising inner ring 2, tapered rollers 3, and cage 4) and the outer ring 1 have rust-preventive lubricating oil applied thereto (by immersing, spraying, or any other method) and the two are put together to complete a bearing for shipping.

The rust-preventive lubricating oil applied when the bearing is shipped desirably has a kinematic viscosity at 20° C. of 120 cst or more and a rust-preventive ability. In this embodiment, "Showa Shell VSI Circulating Oil 100" was applied. The main characteristics of "Showa Shell VSI Circulating Oil 100" are as follows.

Specific gravity (15/40° C.): 0.881
Flowing point (° C.): −7.5
Kinematic viscosity (cst, at 20° C.): 340
Viscosity index: 95
Copper plate corrosion: 1b
Aniline point (° C.): 114.0
Total acid number (mgKOH/g) 0.45

Figure 7:
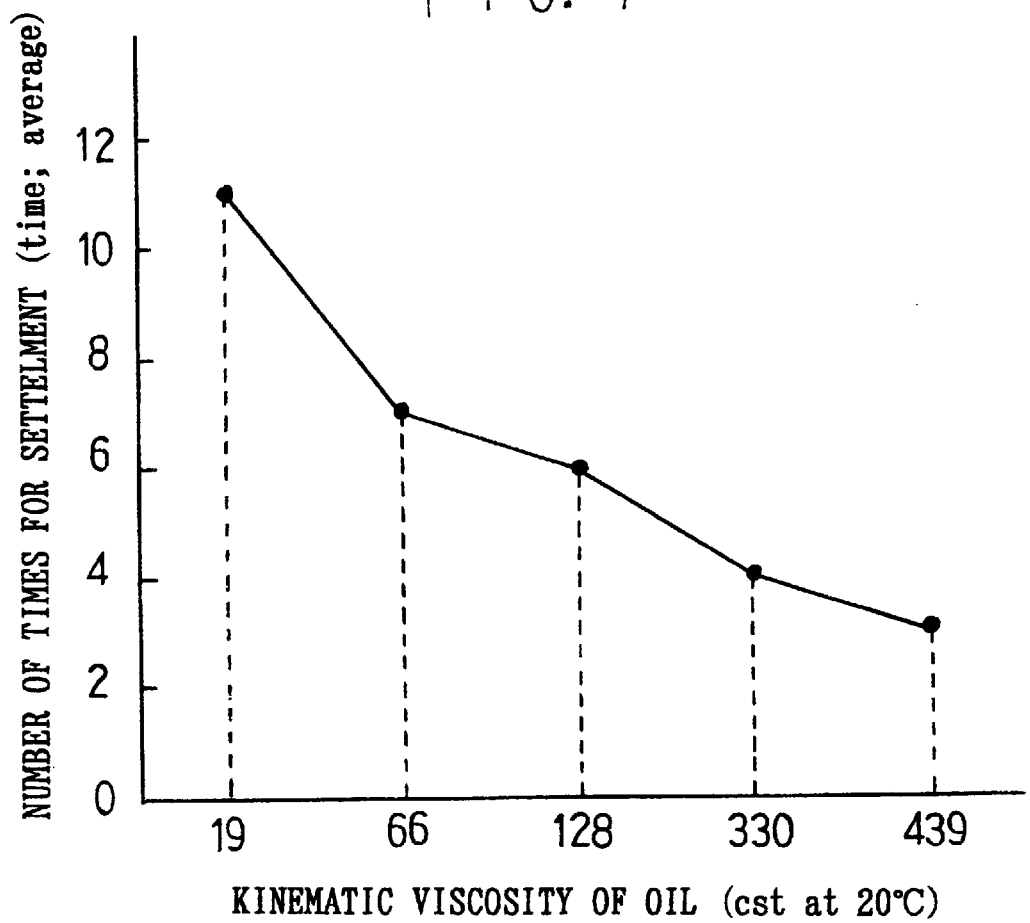
FIG. 7 is a graph showing the relationship between the kinematic viscosity of oil to be applied and the number of times for settlement of a bearing.
Figure 8:
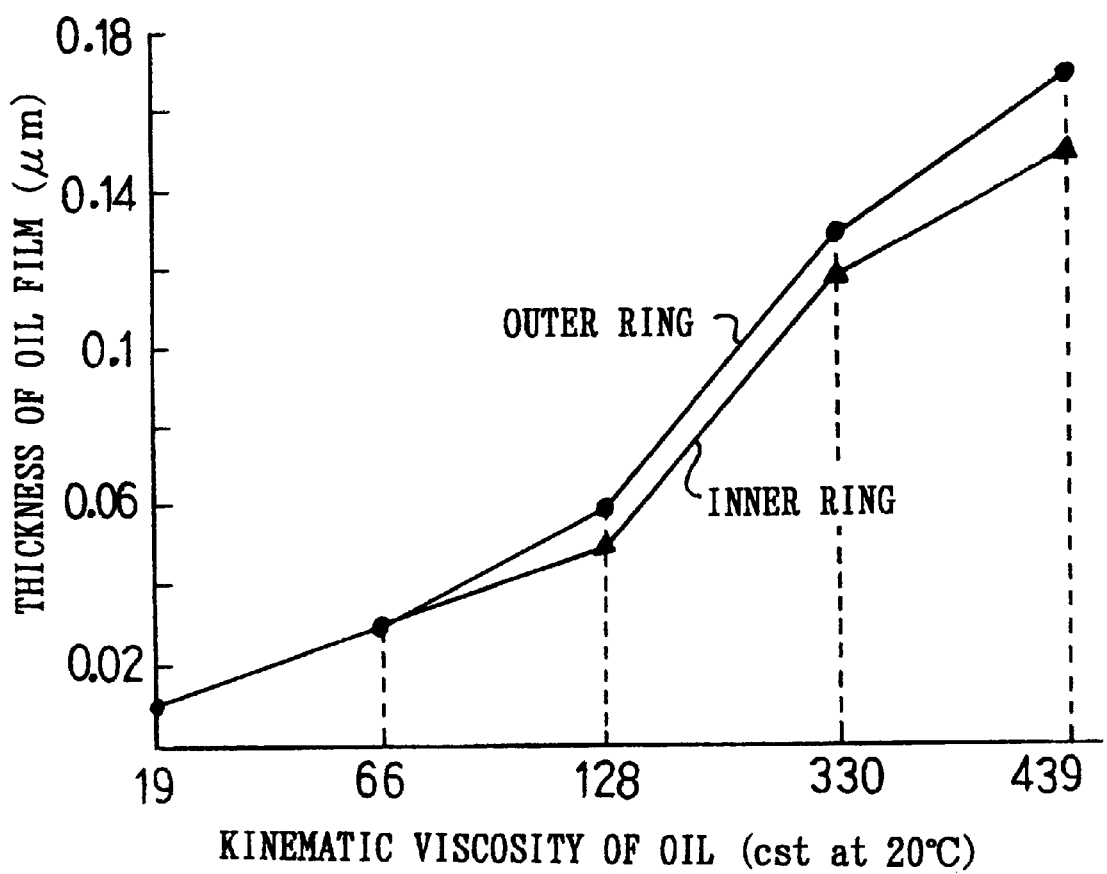
FIG. 8 is a graph showing the relationship between the kinematic viscosity of oil to be applied and the oil film thickness.

The aforesaid rust-preventive lubricating oil has a kinematic viscosity of 340 cst at 20° C., and a running-in operation is performed with this rust-preventive lubricating oil applied; from the test results shown in FIG. 7, it is seen that the number of times for settlement of the bearing is 4 on the average (minimum, 2), which means that the running-in operation can be completed in a relatively short time. At the same time, since said rust-preventive lubricating oil is also superior in rust prevention, rusting of the bearing can be prevented.

Figure 9:
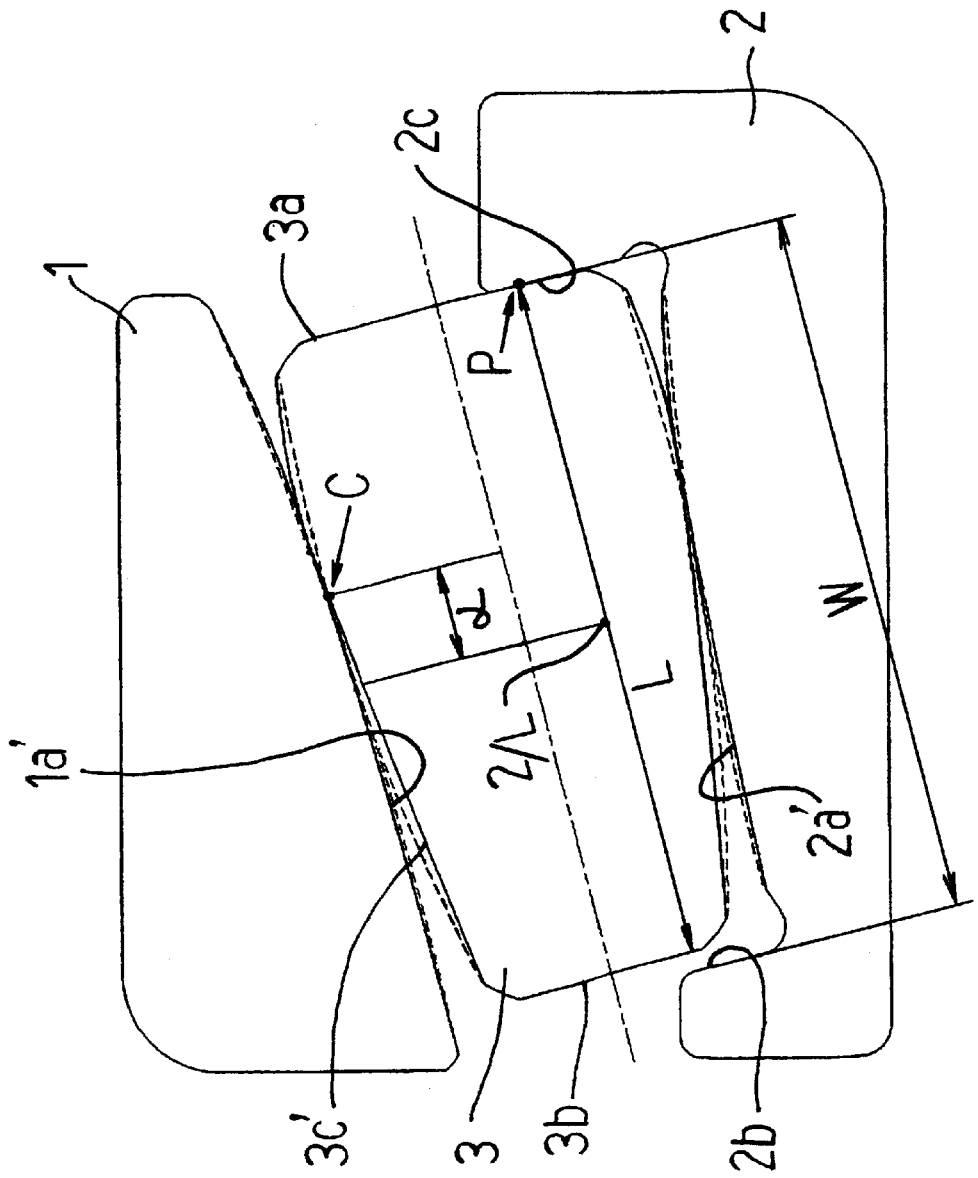
FIG. 9 is a sectional view of a tapered roller bearing according to another embodiment.

FIG. 9 schematically shows a state of contact between the raceway surfaces 1a' and 2a' of the outer and inner rings 1 and 2 and the rolling surface 3c' of the tapered roller 3 in another embodiment of the invention. The crowning is shown greatly exaggerated. Further, illustration of the cage 4 is omitted. The dotted lines indicate the shapes of the raceway surface and rolling surface of the conventional bearing in exaggeration. The apexes of the crownings of the raceway surface and rolling surface of the conventional bearing are located at their respective axial centers, and the center of contact between the rolling surface and the raceway surface is located at the axial center of the tapered roller.

In this embodiment, the apexes of the crownings of the raceway surface 1a', raceway surface 2a' and rolling surface 3c' are shifted from their respective axial centers toward the large diameter side, whereby the center position C of contact between the raceway surfaces 1a' and 2a' and the rolling surface 3c' s shifted from the axial center of the tapered roller 3 (i.e., from the position of ½ L) toward the large diameter side by a predetermined amount α. The amount of shift α may be set within the range of more than 0 to not more than 10% of the length (L) of the tapered roller 3. In this embodiment, it is set such tha α=5%. In addition, the length (L) is the dimension between the small end face 3b and the position of contact P where the large end face 3a contacts the cone back face rib face 2c (the dimension being parallel to the axis of the tapered roller 3). The amount of crowning (the amount of drop) can be optionally set within the range of 1–6 μm for the rolling surface 3c', 1–20 μm for the raceway surface 1a', and 1–20 μm for the raceway surface 2a' (10–50 μm for compound crowning). Such arrangement ensures smooth axial movement of the tapered roller 3 toward the cone back face rib face 2c during the running-in operation and shortens the running-in operation time. The other details may be made according to the above embodiment.

Figure 10:
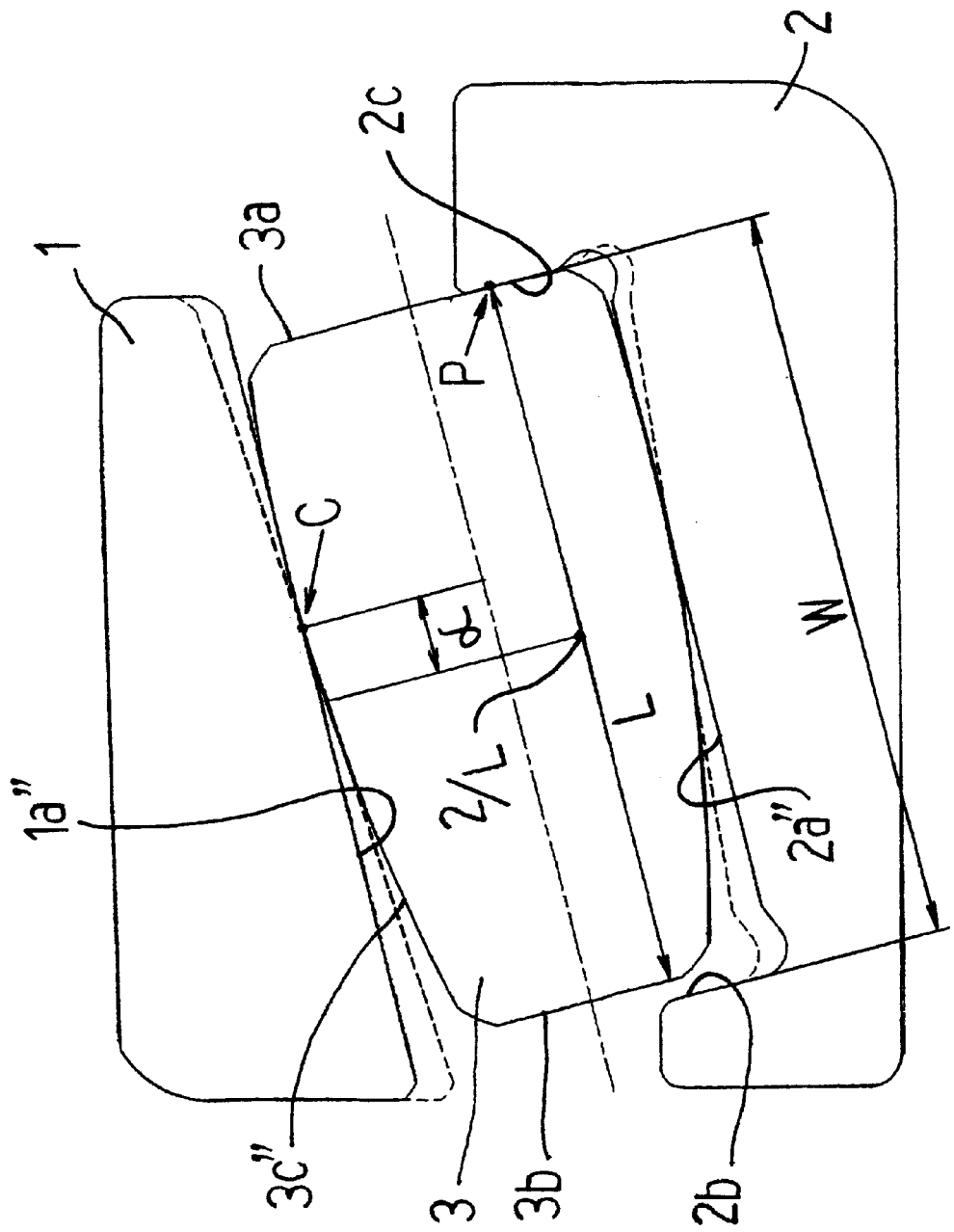
FIG. 10 is a sectional view of a tapered roller bearing according to another embodiment.
Figure 11:
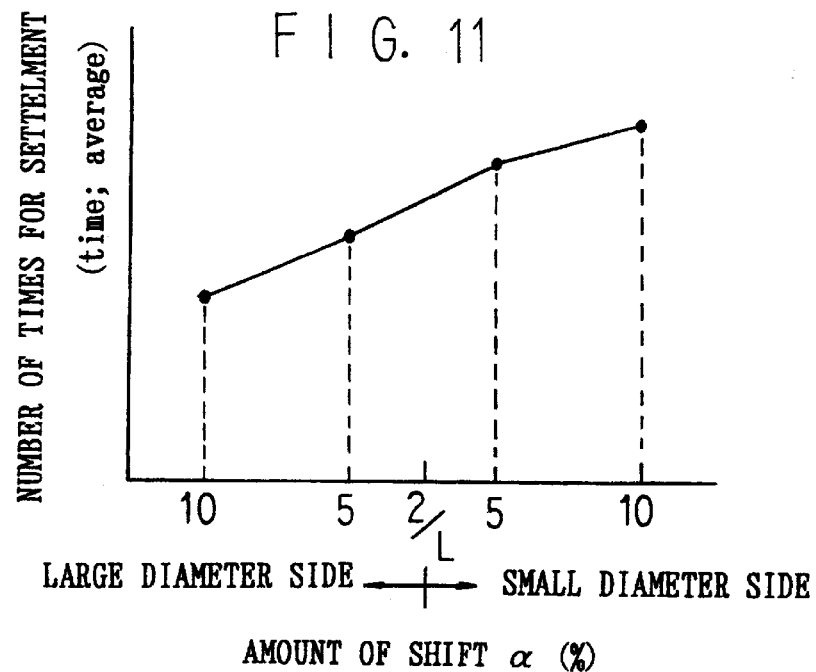
FIG. 11 is a graph showing the relationship between the amount of deviation of the contact center and the number of times for settlement of a bearing.

In another embodiment shown in FIG. 10, the contact angle of the raceway surface 1a" of the outer ring 1 (the angle at which an extension of the raceway surface 1a" crosses the axis of the bearing: strictly, the angle at which the tangent at the center position C of contact of the raceway surface 1a" crosses the axis of the bearing) is smaller than in the conventional bearing (shown in dotted lines in the same figure), while the contact angle of the raceway surface 2a" of the inner ring 2 is greater than in the conventional bearing (shown in dotted lines in the same figure), whereby the center position C of contact between the raceway surfaces 1a" and 2a" and the rolling surface 3c" is axially shifted from the axial center of the tapered roller 3 (the position of ½ of the length L) toward the large diameter side by a predetermined amount α. The other details may be the same as in the above embodiment.

Figure 12:
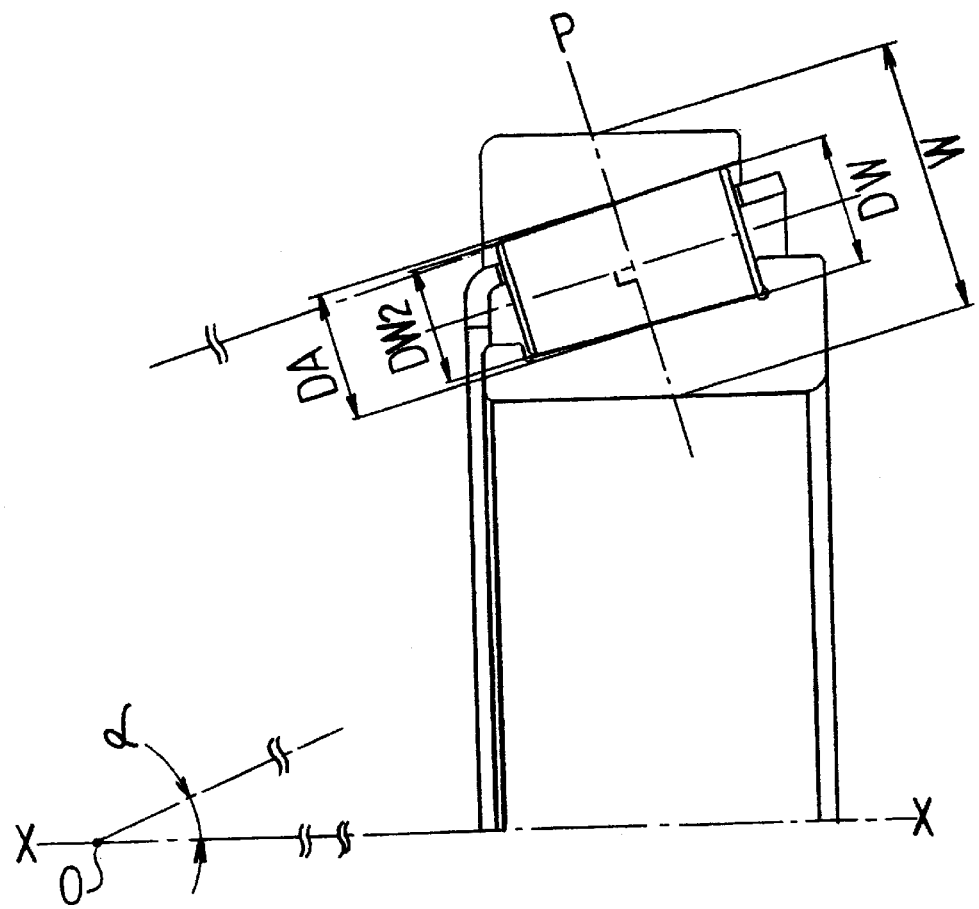
FIG. 12 is a sectional view of a tapered roller bearing according to another embodiment.

FIG. 12 shows another embodiment of the invention. In this embodiment, the contact angle a of the raceway surface 1a of the outer ring 1 is set to 22.5 degrees, the thickness ratio PR (=DA/W×100) to 46%, the roller coefficient γ{=(Z·DA)/(π·PCD)} to 0.88, and the ratio (L/DA) to 1.81. Further, the average roughness (R) which is the average of the roughness (Rr) of the large end face 3a of the tapered roller 3 and the roughness (Rb) of the cone back face rib 2c of the inner ring 2 is set to 0.14 μm Ra or less. The other details may be the same as in the above embodiment.

The contact angle α is an angle which the raceway surface 1a of the outer ring 1 forms with the bearing axis X. The thickness ratio PR is the ratio of the average diameter DA of the tapered roller 3 to the distance W between the inner surface of the inner ring 2 and the outer surface of the outer ring 1, taken in a section P extending orthogonal to the axis of the tapered roller 3 and through the position where the diameter of the tapered roller 3 takes the value of the average diameter DA. The average diameter DA of the tapered roller 3 is expressed as DA=(DW+DW2)/2 where DW is the diameter of the large end face 3a and DW2 is the diameter of the small end face 3b. Let PBAS be the radius of curvature of the end surface R of the large end face 3a, β be the conical angle of the rolling surface and L be the length of the tapered roller 3. Then, DW=2·RBAS·tan (β/2), and DW2=2 (RBAS–L)·tan (β/2).

Figure 13:
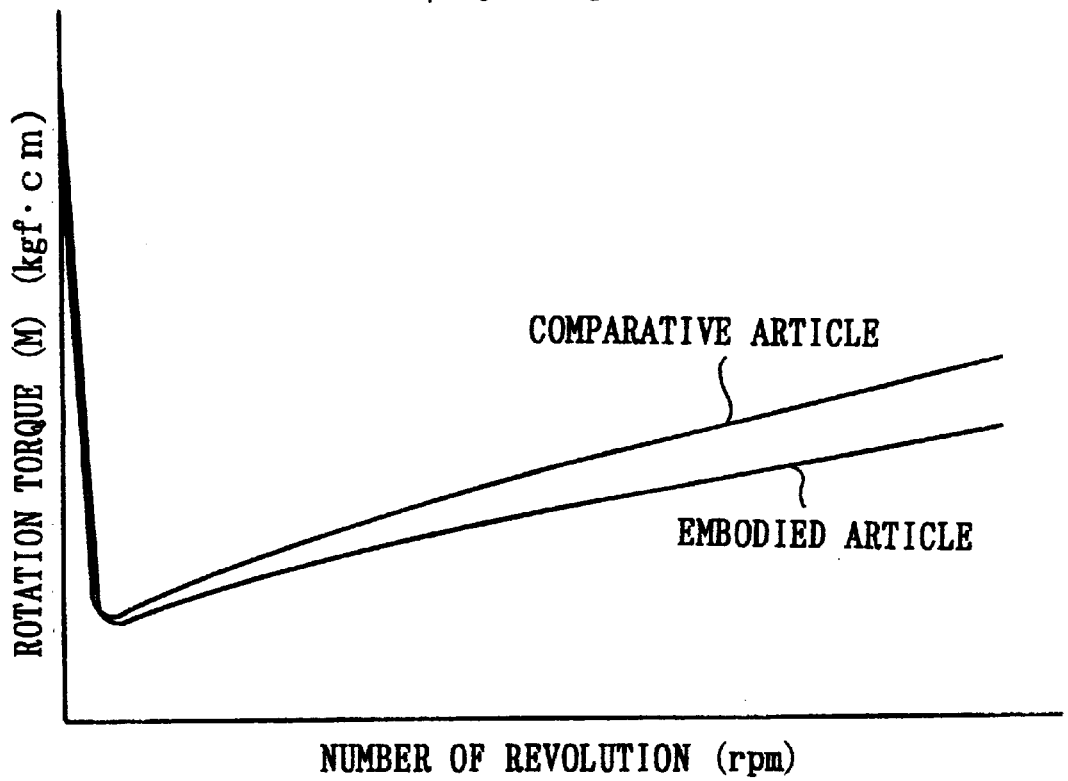
FIG. 13 is a graph showing the relationship between rpm and torque.
Figure 14:
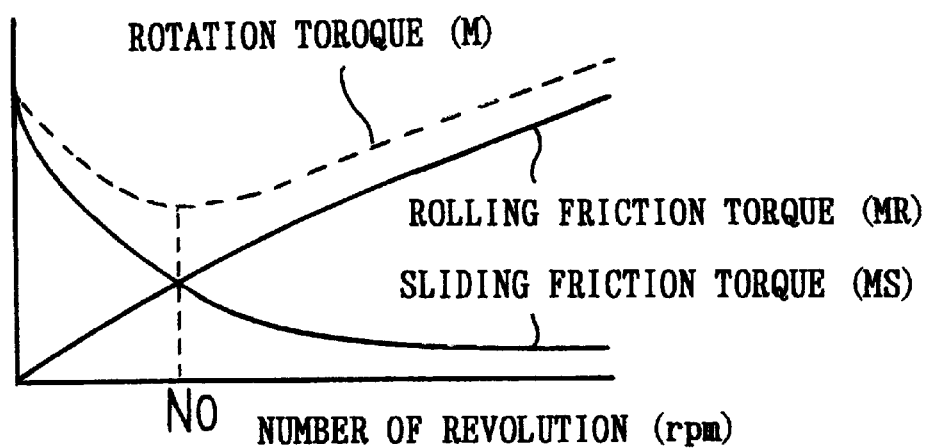
FIG. 14 is a graph showing the relationship between rpm and torque.
Figure 15:
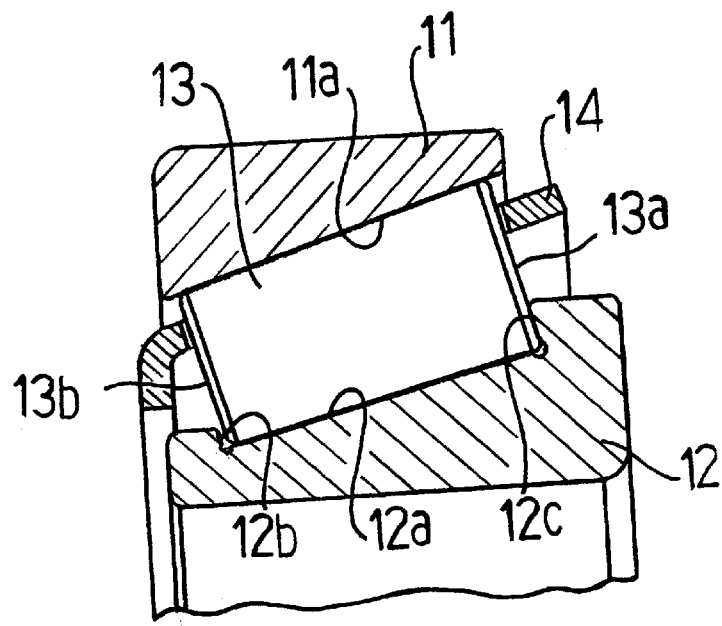
FIG. 15 is a sectional view of a conventional tapered roller bearing.
Figure 17:
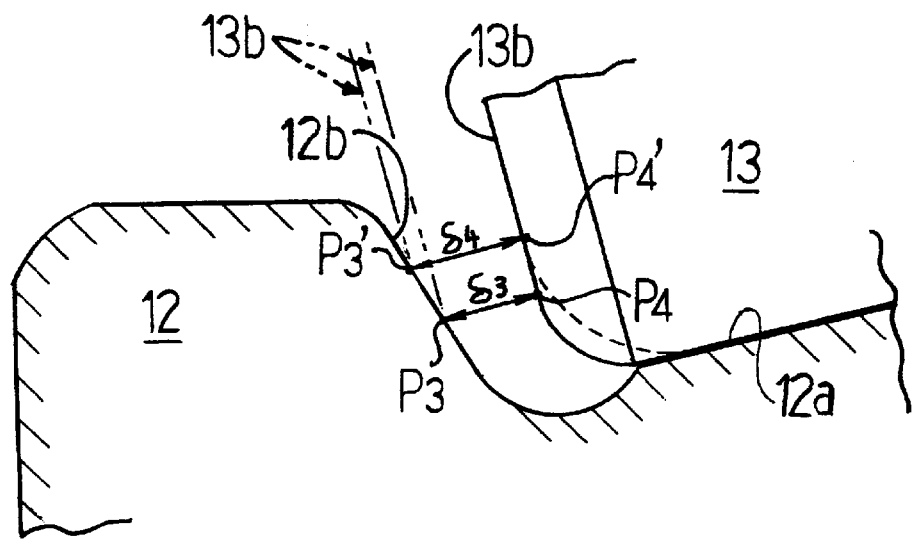
FIG. 17 is a partial enlarged sectional view showing the peripheries of a retaining rib face and a small end face in a conventional tapered roller bearing.
Figure 16A:
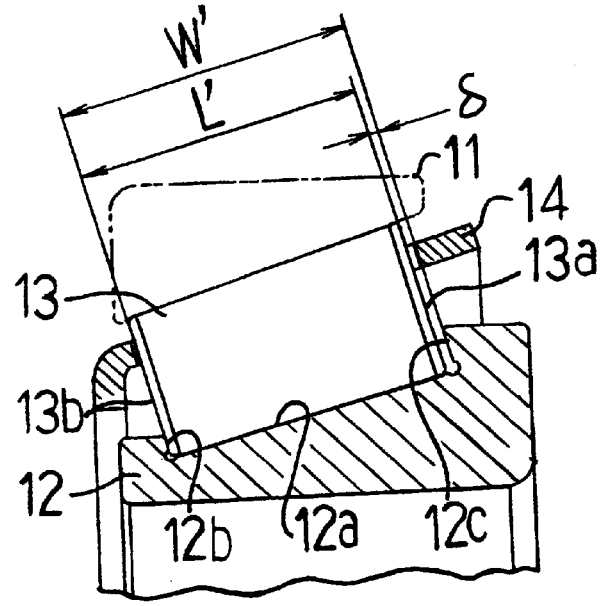
FIG. 16 is a sectional view showing the state (initial state) in the assembling of a conventional tapered roller bearing {FIG. 16(*a*)}, a sectional view showing the state subsequent to running-in {FIG. 16(*b*)}, and a sectional view showing the state during running-in {FIG. 16(*c*)}.
Figure 16C:
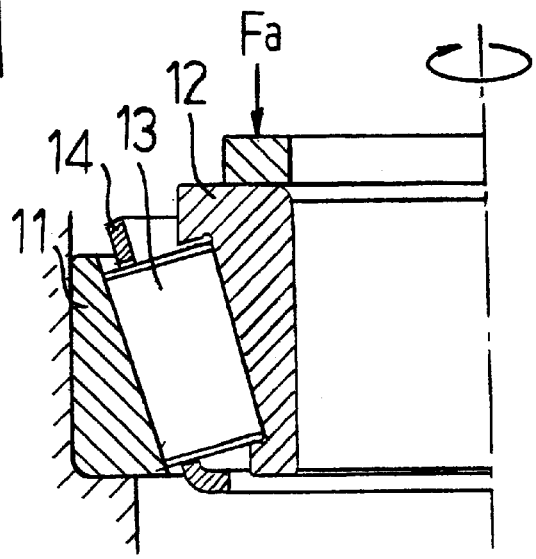
Figure 16B:
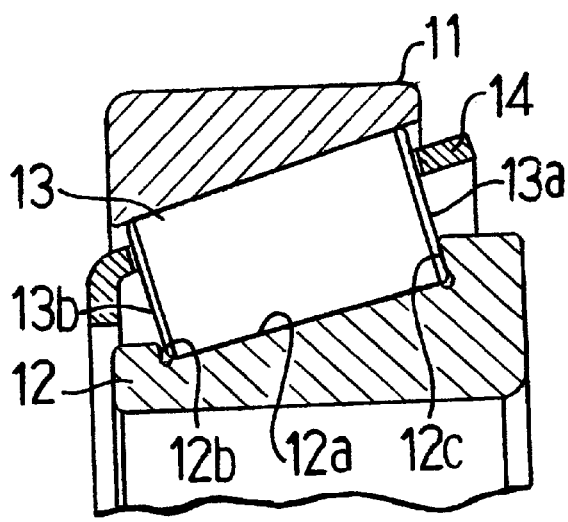

FIG. 13 shows the results of measurement of rotation torque (M) under load condition of thrust load Fa=1,000 kgf concerning the tapered roller bearing of the above arrangement (embodied article) and a tapered roller bearing (comparative article) having its parameters set such that contact angle α=20 degrees, thickness ratio PR=38%, roller coefficient γ=0.85 and ratio (L/DA)=2.38. As shown in the same figure, the embodied article exhibits a superior low torque property in the high and medium speed ranges of rotation, as compared with the comparative article.

In addition, the tapered roller bearings in the embodiments described above are suitable for use as bearings to be incorporated not only in the differential but also in the transmission and the like of an automobile.

What is claimed is:

1. A tapered roller bearing comprising:

an outer ring having a conical raceway surface;

an inner ring having a conical raceway surface, a retaining rib face at small diameter side of the raceway surface, and a cone back face rib face at large diameter side of the raceway surface;

a plurality of tapered rollers disposed for rolling between the raceway surface of the outer ring and the raceway surface of the inner rings; and a cage for retaining the tapered rollers at predetermined circumferential intervals, wherein during operation of the bearing, large end faces of the tapered rollers are contacted and guided by the cone back face rib face of the inner ring, and wherein the retaining rib face of the inner ring is a surface which is parallel to small end faces of the tapered rollers disposed on the raceway surface of the inner ring and which defines one end of a raceway groove width of the inner ring defining the range of axial movements of the tapered rollers.

2. A tapered roller bearing as set forth in claim 1, wherein clearances δ defined between the retaining rib face of the inner ring and the small end faces of the tapered rollers when the tapered rollers are disposed on the raceway surface of the inner ring and contacted at the large end faces thereof with the cone back face rib face of the inner ring is secured within the range, δ≦0.44 mm.

3. A tapered roller bearing as set forth in claim 1 or 2, wherein the retaining rib face of the inner ring is a grinding-finished surface.

4. A tapered roller bearing as set forth in claim 1 or 2, wherein the retaining rib face of the inner ring is a lathing-finished surface.

5. A method of producing an inner ring for a tapered roller bearing, the inner ring having a conical raceway surface, a retaining rib face at small diameter side of the raceway surface, and a cone back face rib face at large diameter side of the raceway surface, comprising the steps of:

working the retaining rib face so as to be a surface which is parallel to small end faces of tapered rollers when the tapered rollers are disposed on the raceway surface, and grinding-finishing the cone back face rib face while measuring a raceway groove width (W) from the retaining rib face as a dimensional reference to the cone back face rib face by using an in-process gauge.

6. A method of producing an inner ring for a tapered roller bearing as set forth in claim 5, wherein the retaining rib face of the inner ring is grinding-finished.

7. A method of producing an inner ring for a tapered roller bearing as set forth in claim 5, wherein the retaining rib face of the inner ring is lathing-finished.

8. A method of producing a tapered roller bearing, the tapered roller bearing comprising an outer ring having a conical raceway surface, an inner ring having a conical raceway surface and a retaining rib face at small diameter side of the raceway surface and a cone back face rib face at large diameter side of the raceway surface, a plurality of tapered rollers disposed for rolling between the raceway surface of the outer ring and the raceway surface of the inner rings, and a cage for retaining the tapered rollers at predetermined circumferential intervals, wherein during operation of the bearing, large end faces of the tapered rollers are contacted and guided by the cone back face rib face of the inner ring, comprising the steps of:

working the retaining rib face of the inner ring so as to be a surface which is parallel to small end faces of the tapered rollers when the tapered rollers are disposed on the raceway surface of the inner ring, grinding-finishing the cone back face rib face of the inner ring while measuring a raceway groove width (W) from the retaining rib face as a dimensional reference to the cone back face rib face by using an in-process gauge, controlling length (L) of each of the tapered roller to be within a predetermined dimensional tolerance, and measuring clearances δ defined between the retaining rib face of the inner ring and the small end faces of the tapered rollers when the tapered rollers are disposed on the raceway surface of the inner ring and contacted at the large end faces thereof with the cone back face rib face of the inner ring, whereby the clearances δ are secured within the range, $\delta \leq 0.4$ mm.

9. A method of producing a tapered roller bearing as set forth in claim 8, wherein the retaining rib face of the inner ring is grinding-finished.

10. A method of producing a tapered roller bearing as set forth in claim 8, wherein the retaining rib face of the inner ring is lathing-finished.

11. A tapered roller bearing comprising:

an outer ring having a conical raceway surface;

an inner ring having a conical raceway surface, a retaining rib face at small diameter side of the raceway surface, and a cone back face rib face at large diameter side of the raceway surface;

a plurality of tapered rollers disposed for rolling between the raceway surface of the outer ring and the raceway surface of the inner rings; and a cage for retaining the tapered rollers at predetermined circumferential intervals, wherein a rust-preventive lubricating oil whose kinematic viscosity at 20° C. is 120 cst or more is applied to at least surface of the components of the bearing being subjected to friction.

12. A tapered roller bearing as set forth in claim 11, wherein the oil film parameter Λ expressed by the following formula is 1 or more:

$$\Lambda = h_0/(\sigma_1^2 + \sigma_2^2)^{1/2}$$

$h_0$: thickness of oil film formed between rolling surface of tapered roller and raceway surfaces of inner and outer rings $\sigma_1$: average roughness of rolling surface of tapered roller $\sigma_2$: average roughness of raceway surfaces of inner and outer rings.

13. A tapered roller bearing as set forth in claim 11 or 12 which is used for supporting a rotary shaft in a gear device of an automobile.

14. A rotary shaft supporting structure for a gear device of an automobile which rotatably supports a rotary shaft installed in a casing by tapered roller bearing with respect to the casing, the tapered roller bearing comprising an outer ring having a conical raceway surface, an inner ring having a conical raceway surface and a retaining rib face at small diameter side of the raceway surface and a cone back face rib face at large diameter side of the raceway surface, a plurality of tapered rollers disposed for rolling between the raceway surface of the outer ring and the raceway surface of the inner rings, and a cage for retaining the tapered rollers at predetermined circumferential intervals, wherein the rotary shaft and the tapered roller bearing are rotated through a required number of revolutions for a running-in operation in a state that a rust-preventive lubricating oil whose kinematic viscosity at 20° C. is 120 cst or more is applied to at least surface of the components of the bearing being subjected to friction, and then a predetermined pre-load is applied to the tapered roller bearing.

15. A rotary shaft supporting structure for a gear device of an automobile as set forth in claim 14, wherein the casing is a differential case, and the rotary shaft is a drive pinion shaft, a front end of the drive pinion shaft a propeller shaft being connected to and a rear end of the drive pinion shaft a drive pinion gear meshing with a ring gear being provided with.

16. A tapered roller bearing comprising:

an outer ring having a conical raceway surface formed with a crowning;

an inner ring having a conical raceway surface formed with a crowning, a retaining rib face at small diameter side of the raceway surface, and a cone back face rib face at large diameter side;

a plurality of tapered rollers disposed for rolling between the raceway surface of the outer ring and the raceway surface of the inner ring, each of the tapered rollers having conical rolling surface formed with a crowning; and a cage for retaining the tapered rollers at predetermined circumferential intervals, wherein a center position of contact between the rolling surface of each of the tapered rollers and the raceway surfaces of the inner and outer rings is shifted from axial center of the tapered roller toward the large diameter side.

17. A tapered roller bearing as set forth in claim 16, wherein the amount of shift α of the center position of contact is within the range, $0 < \alpha \leq 0.1$ L where L is length of the tapered roller.

18. A tapered roller bearing as set forth in claim 16 or 17 which is used for supporting a rotary shaft in a gear device of an automobile.

19. A rotary shaft supporting structure for a gear device of an automobile which rotatably supports a rotary shaft installed in a casing by tapered roller bearing with respect to the casing, the tapered roller bearing comprising an outer ring having a conical raceway surface formed with a crowning, an inner ring having a conical raceway surface formed with a crowning and a retaining rib face at small diameter side of the raceway surface and a cone back face rib face at large diameter side, a plurality of tapered rollers disposed for rolling between the raceway surface of the outer ring and the raceway surface of the inner ring, each of the tapered rollers having conical rolling surface formed with a crowning, and a cage for retaining the tapered rollers at predetermined circumferential intervals, wherein a center position of contact between the rolling surface of each of the tapered rollers and the raceway surfaces of the inner and outer rings is shifted from axial center of the tapered roller toward the large diameter side.

20. A rotary shaft supporting structure for a gear device of an automobile as set forth in claim 19, wherein the casing is a differential case, and the rotary shaft is a drive pinion shaft, a front end of the drive pinion shaft a propeller shaft being connected to and a rear end of the drive pinion shaft a drive pinion gear meshing with a ring gear being provided with.

21. A taper roller bearing for supporting a drive pinion shaft of a differential gear, the taper roller bearing rotatably supporting the drive pinion shaft with respect to a casing, a front end of the drive pinion shaft a propeller shaft being connected to and a rear end of the drive pinion shaft a drive pinion gear meshing with a ring gear being provided with, wherein an angle (contact angel $\alpha$) between a raceway surface of an outer ring and a bearing axis is 21–25 degrees, the ratio (thickness ratio PR=DA/W×100) of an average diameter (DA) of a tapered roller to a distance (W) between an inner surface of an inner ring and an outer surface of the outer ring, taken in a section extending orthogonal to an axis of the tapered roller and through a position where diameter of the tapered roller takes the value of the average diameter (DA), is 40–51%, the roller coefficient ($\gamma$) expressed by $\gamma=(Z \cdot DA)/(\pi \cdot PCD)$ (Z: number of tapered rollers, DA: average diameter of tapered rollers, PCD: pitch circle diameter of tapered rollers) is 0.86–0.94, the ratio (L/DA) of length (L) of the tapered roller to the average diameter (DA) is 1.20–2.25.

22. A taper roller bearing for supporting a drive pinion shaft of a differential gear as set forth in claim 21, wherein average roughness (R) $\{R=(Rr^2+Rb^2)^{1/2}\}$ is 0.14 $\mu$m Ra or less where roughness of large end face of the taper roller is (Rr) and roughness of the cone back face rib face of the inner ring is (Rb).

* * * * *